(12) United States Patent
Ragan

(10) Patent No.: US 12,319,515 B2
(45) Date of Patent: Jun. 3, 2025

(54) CONVEYOR SYSTEM WITH TRANSFER BELTS

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 157 days.

(21) Appl. No.: 18/266,104

(22) PCT Filed: Jan. 10, 2022

(86) PCT No.: PCT/US2022/011792
§ 371 (c)(1),
(2) Date: Jun. 8, 2023

(87) PCT Pub. No.: WO2022/155089
PCT Pub. Date: Jul. 21, 2022

(65) Prior Publication Data
US 2024/0034572 A1 Feb. 1, 2024

Related U.S. Application Data

(60) Provisional application No. 63/137,400, filed on Jan. 14, 2021.

(51) Int. Cl.
*B65G 47/84* (2006.01)
*B65G 15/14* (2006.01)
*B65G 17/18* (2006.01)
*B65G 47/66* (2006.01)

(52) U.S. Cl.
CPC ......... *B65G 47/841* (2013.01); *B65G 15/14* (2013.01); *B65G 17/18* (2013.01); *B65G 47/66* (2013.01)

(58) Field of Classification Search
CPC ...... B65G 47/841; B65G 17/18; B65G 15/12; B65G 15/14; B65G 47/66
USPC ........................................................ 198/418
See application file for complete search history.

(56) References Cited

U.S. PATENT DOCUMENTS

| 4,771,877 A * | 9/1988 | Langen ................. B65G 47/31 198/579 |
| 6,550,602 B2 * | 4/2003 | Steeber ................. B65G 21/18 198/444 |
| 7,055,676 B2 * | 6/2006 | Hartness ............. B65G 47/847 198/803.7 |

(Continued)

FOREIGN PATENT DOCUMENTS

| JP | S52117791 A | 10/1977 |
| JP | S5479690 U | 6/1979 |
| JP | H0333817 U | 4/1991 |

OTHER PUBLICATIONS

DE19750996 (Year: 1999).*
WO2023247644 (Year: 2023).*

*Primary Examiner* — Gene O Crawford
*Assistant Examiner* — Lester Rushin, III
(74) *Attorney, Agent, or Firm* — Catherine M. Bishop

(57) ABSTRACT

A transfer conveyor for transferring products from the end of a first product conveyor onto a second product conveyor comprises transfer conveyor belts including movable flaps for lifting and carrying the product over a transfer gap between the first product conveyor and the second product conveyor. A frame guides the transfer conveyor belts and moves the flaps between a deployed and retracted position.

14 Claims, 6 Drawing Sheets

(56) References Cited

U.S. PATENT DOCUMENTS

| | | | |
|---|---|---|---|
| 7,278,531 B2* | 10/2007 | Hartness | B65G 17/385 |
| | | | 198/470.1 |
| 9,567,164 B2* | 2/2017 | Kirkpatrick, Jr. | B65G 47/66 |
| 10,035,663 B2* | 7/2018 | Ford | B65B 49/14 |
| 2023/0126348 A1* | 4/2023 | Elder | B65G 15/14 |
| | | | 198/626.2 |

* cited by examiner

CONVEYOR SYSTEM WITH TRANSFER BELTS

RELATED APPLICATIONS

The present invention claims priority to U.S. Provisional Patent Application No. 63/137,400 filed Jan. 14, 2021 and entitled "Conveyor System with Transfer Belts", the contents of which are herein incorporated by reference.

BACKGROUND

The invention relates generally to power-driven conveyors and more particularly to conveyors having transfer belts facilitating transfer between end-to-end conveyors.

Conveyors, such as endless conveyor belts trained around reversing elements at each end, or roller conveyors comprising a series of rotatable rollers for moving objects, are often arranged end-to-end with a gap between the downstream end of an upstream conveyor and the upstream end of a downstream conveyor. Bridging the gap can be problematic for certain articles. Various transfer mechanisms, such as transfer belts, transfer plates and transfer platforms have been used to provide a smoother product transfer between the confronting ends of the two conveyors.

Transfers often cause jostling of conveyed products, such as trays holding meat, which requires manual intervention (called 'styling'). Other products require gentle transfer because of top-heavy packaging (e.g. tall bottles) that are prone to toppling during transfer.

SUMMARY

A conveyor system includes a transfer conveyor for gently transferring products between two product conveyors. The transfer conveyor comprises a frame and two transfer conveyor belts nestled around the product conveyors for lifting and transferring product over a transfer gap between the product conveyors. Each transfer conveyor belt comprises a series of modules arranged in an endless loop and containing a plurality of movable lifting flaps for carrying the product in the transfer region.

According to one aspect, a transfer conveyor for transferring product comprises a frame configured to overlay a transfer gap between a first product conveyor and a second product conveyor. The frame comprises a first outer side wall having a first section that extends along a first side of the first product conveyor, a second section that curves laterally inwards and a third section that bridges the transfer gap a second outer side wall having a first section extends along a second side of the first product conveyor, a second section that curves laterally inwards and a third section that bridges the transfer gap, and a transfer plate extending between the third sections of the first and second outer side walls, the transfer plate bridging the transfer gap. The transfer conveyor further comprises a first transfer conveyor belt comprising a plurality of hingedly connected modules capable of shifting laterally relative to each other and forming an endless loop, the first transfer conveyor belt extending between the first product conveyor and the second product conveyor adjacent to the first outer side wall. The transfer conveyor further comprises a second transfer conveyor belt comprising a plurality of hingedly connected modules capable of shifting laterally relative to each other and forming an endless loop, the second transfer conveyor belt extending between the first product conveyor and the second product conveyor adjacent to the second outer side wall.

According to another aspect, a conveying system, comprises a first product conveyor for conveying product from an infeed to an outfeed, a second product conveyor for receiving product conveyed by first product conveyor and conveying the product away from the first product conveyor, the second product conveyor having an infeed separated from the first product conveyor outfeed by a transfer gap and a transfer conveyor extending between the first product conveyor and the second product conveyor for lifting and carrying the product over the transfer gap.

According to still another aspect a module for a transfer conveyor comprises a main body, a first hinge element extending from a first end of the main body, a pair of hinge elements extending from a second end of the main body and forming a space for receiving the first hinge element of an adjacent module in a transfer conveyor belt formed by hingedly connecting a plurality of modules together and a lifting flap pivotally connected to a first side of the module body to form a surface for supporting a conveyed product.

DETAILED DESCRIPTION

A conveying system includes a transfer conveyor for gently transferring product from a first product conveyor to a second product conveyor using chain conveyors nested around confronting ends of the product conveyors. The invention will be described relative to certain illustrative embodiments, though those skilled in the art will recognize that the invention is not limited to the illustrative embodiments.

Figure 1:
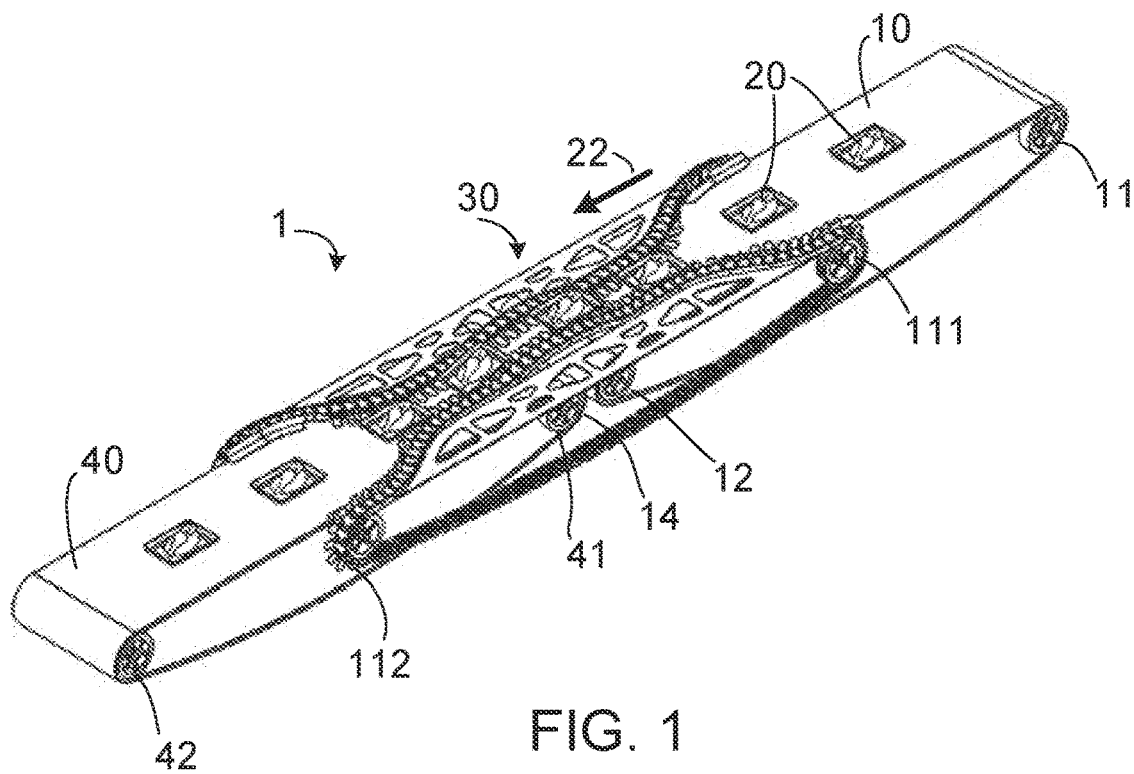
FIG. 1 is an isometric view of a conveyor system including a transfer conveyor according to an embodiment of the invention.
Figure 2:
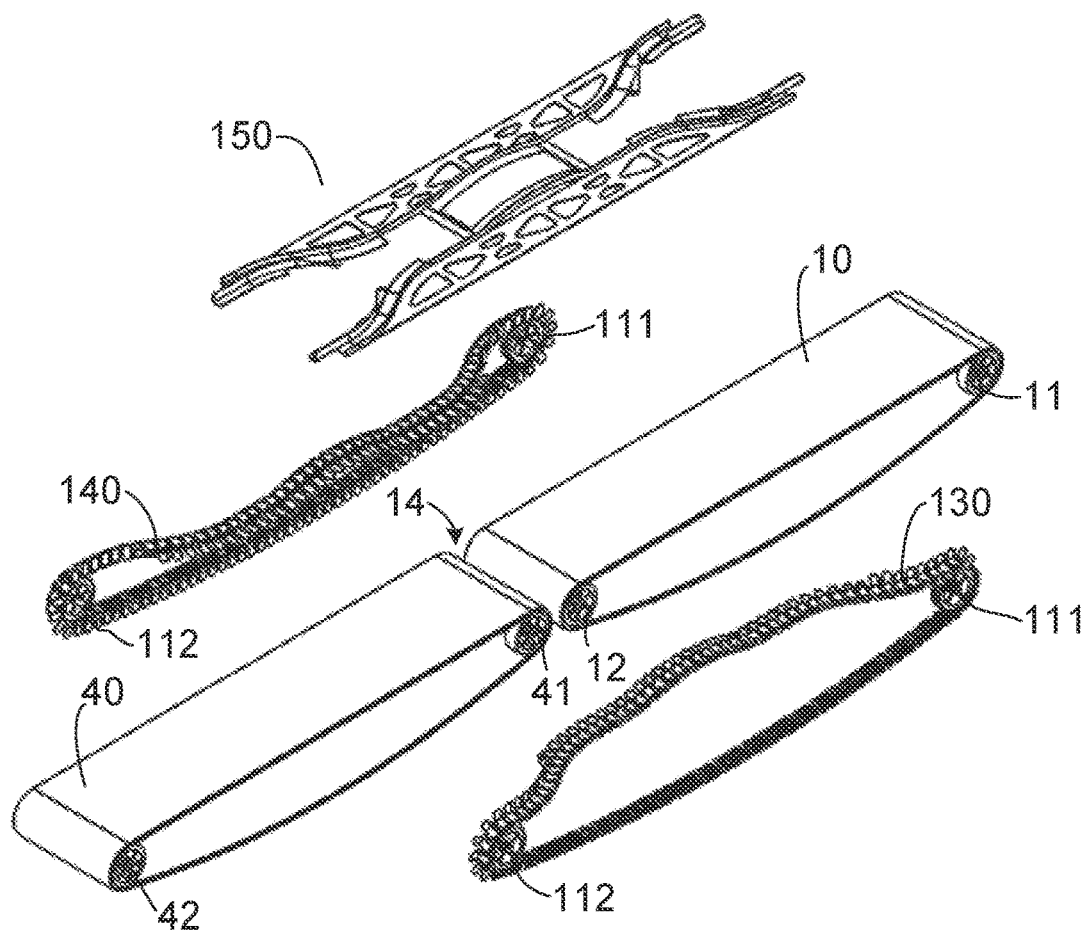
FIG. 2 is an exploded view of the conveyor system of FIG. 1.

One version of a conveying system 1 including a transfer conveyor embodying features of the invention is shown in FIGS. 1 and 2. A conveying system 1 includes a first product conveyor 10, shown as a conveyor belt trained around reversing elements 11, 12 to form a carryway for conveying product 20 in a conveying direction 22, and a returnway below the carryway. Product 20 is transferred via a transfer conveyor 30 to a second product conveyor 40. The transfer conveyor 30 surrounds and lifts the product 20 up and across the transfer gap 14 between the two product conveyors 10, 40 to provide a smooth transition between the two product conveyors 10, 40. The illustrative second product conveyor 40 comprises a conveyor belt trained around reversing elements 41, 42 to form a carryway for continuing to convey product received from the transfer conveyor 30 in the conveying direction 22, and a returnway below the carryway, though the invention is not so limited. The first and second product conveyors 10, 40 can comprise any suitable type of conveyor for conveying product and are not limited to conveyor belts. In addition, the first and second product conveyors are not limited to an in-line, parallel arrangement. In another embodiment, the second product conveyor 40 is angled relative to the first product conveyor 10, and the transfer conveyor 30 can curve between the two product conveyors to bridge the gap between the two product conveyors.

The illustrative transfer conveyor 30 comprises a pair of chain radius belts extending along the sides of the two product conveyors 10, 40 and guided by a frame 150. The chain radius belts comprise a first transfer conveyor belt 130 extending from a first longitudinal location alongside a first side of the first product conveyor 10 to a second longitudinal location alongside a first side of the second product conveyor 40 and a second transfer conveyor belt 140 extending from the first longitudinal location alongside a second side of the first product conveyor 10 to the second longitudinal location alongside a second side of the second product conveyor 40. The transfer conveyor belts 130, 140 travel in the conveying direction alongside the product conveyors 10, 40 and return in a returnway adjacent the returnways of the product conveyors 10, 40. The transfer conveyor belts 130, 140 are trained around reversing elements 111, 112 located at the first and second longitudinal locations. The reversing elements 111, 112 are disposed between the carryway and returnway of the product conveyors 10, 40 along the side edges of the product conveyors 10, 40.

The frame 150 guides the first and second radius conveyor belts 130, 140 through and over the transfer gap 14 between the first product conveyor 10 and the second product conveyor 40. In a central region upstream of the transfer gap 14, the frame 150 pushes the transfer conveyor belts 130, 140 laterally inwards to surround and engage the conveyed product 20. The transfer conveyor belts then convey the product over the transfer gap 14. Downstream of the transfer gap 14, the frame 150 separates the transfer conveyor belts 130, 140, pushing the transfer conveyor belts 130, 140 laterally outwards to release the product to the second product conveyor 40. The second product conveyor 40 then continues to convey the product 20 away from the first product conveyor 10.

Figure 3:
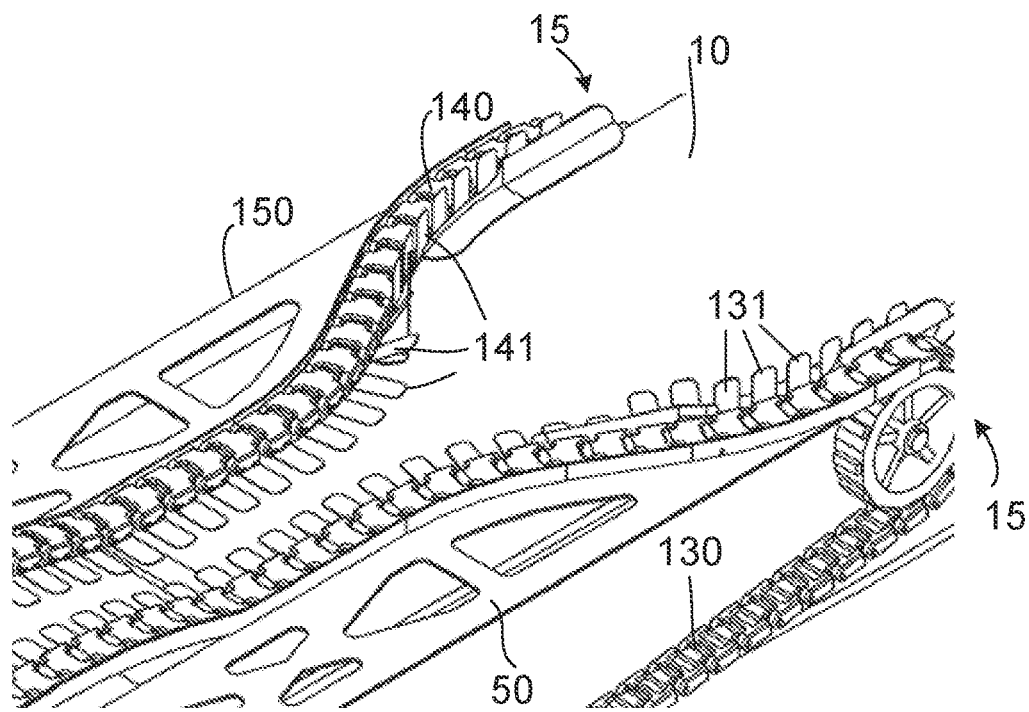
FIG. 3 is a detailed view of the conveyor system of FIG. 1 in the transfer region.
Figure 4:
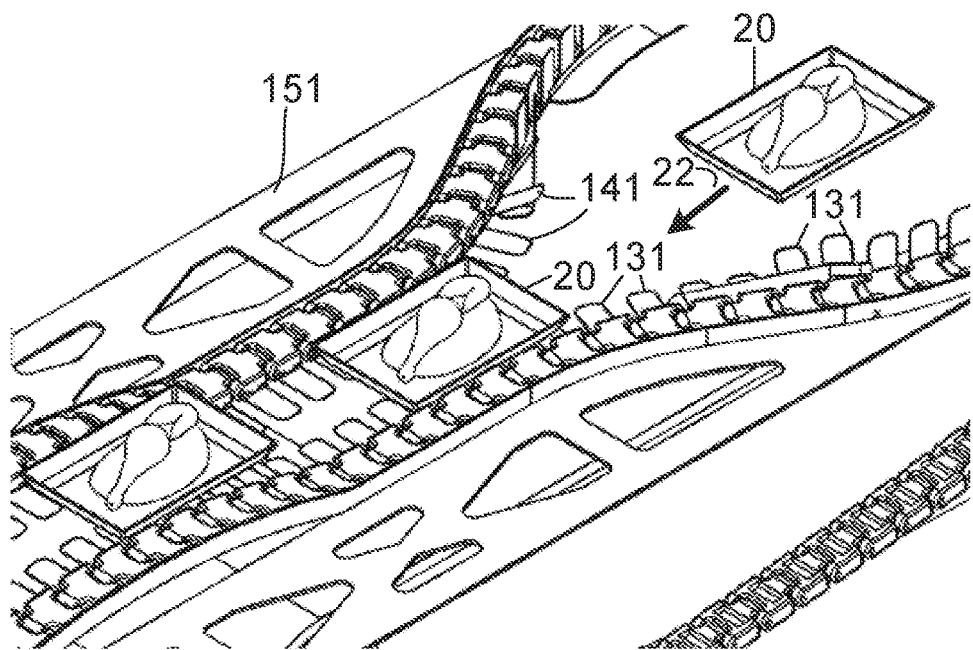
FIG. 4 shows the transfer region of FIG. 3 while conveying and transferring a product.

The illustrative transfer conveyor belts 130, 140 are modular conveyor belts comprising a series of hingedly connected modules capable of shifting laterally relative to each other and arranged in an endless loop. One or more of the modules includes a movable flap or other element for lifting and carrying product over the transfer gap 14. For example, as shown in FIGS. 3 and 4, at the first longitudinal location 15, i.e., the beginning of the carryway for the first and second transfer conveyor belts 130, 140, the belts are spaced out on each side of the first product conveyor belt carryway. As the transfer conveyor belts 130, 140 advance down the carryway towards the end of the first product conveyor 10, the frame 150 pushes the transfer conveyor belts 130, 140 laterally inwards towards the conveyed product 20. The transfer conveyor belts 130, 140 include lifting flaps 131, 141, as described in detail below, that can be deployed to receive the conveyed product 20 from the first product conveyor belt 10 and convey the product over the transfer gap 14. The illustrative lifting flaps 131, 141 converge to support the product 20 from below on each side of the product 20, with minimal impact on the product. After the transfer conveyor belts 130, 140 pass over the transfer gap 14, the transfer conveyor pulls the lifting flaps 131, 141 from the product to release the product 20 to the second product conveyor 40. Alternatively, other means for conveying the product over the transfer gap 14 may be used.

The product conveyors 10, 40 and the transfer conveyor 30 may operate at different speeds to facilitate transfers. For example, the first product conveyor 10 may move faster than the transfer conveyor belts 130, 140 to push product into product receiving region between the transfer conveyor belts, but the invention is not so limited.

Figure 5:
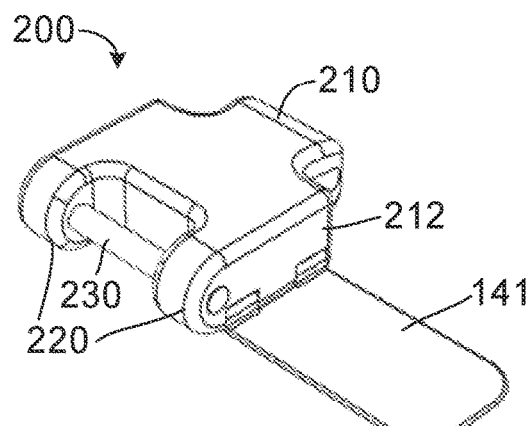
FIG. 5 is an isometric view of a module suitable for forming a transfer conveyor belt according to an embodiment, including a lifting flap in a deployed position.
Figure 6:
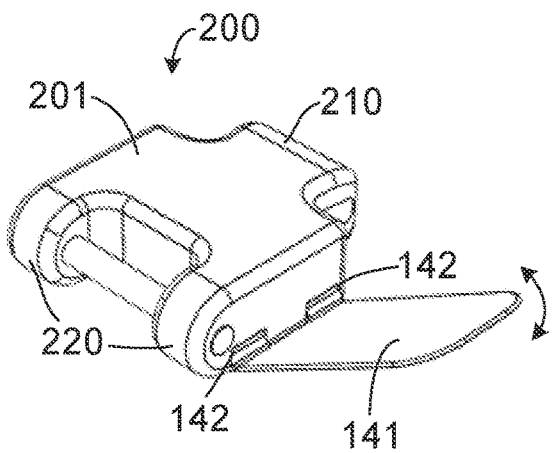
FIG. 6 shows the module of FIG. 5 with the lifting flap in an intermediate position.
Figure 7:
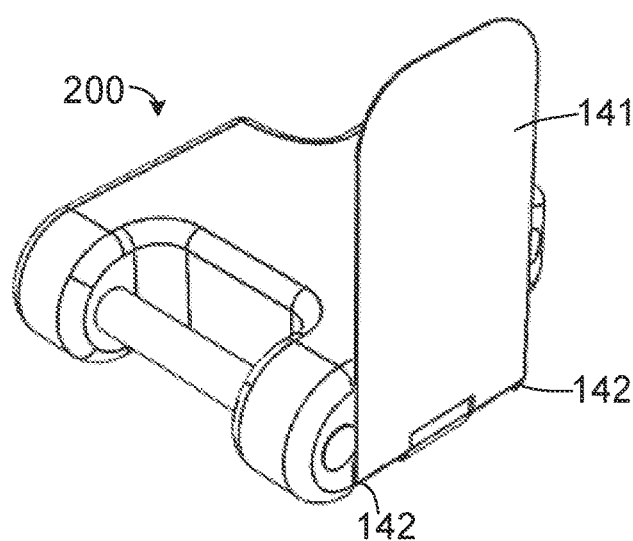
FIG. 7 shows the module of FIG. 5 with the lifting flap in a retracted position.

FIGS. 5-7 show an embodiment of a module 200 suitable for forming a transfer conveyor belt 130 or 140 according to an embodiment. The illustrative module 200 is a radius chain module having a main body 201, a first hinge element 210, shown as a knuckle, extending from a first end of the main body and a pair of hinge elements 220 extending from the second end of the main body and forming a space for receiving the first hinge element of an adjacent module in the transfer conveyor belt. A hinge pin 230 may be inserted through aligned openings of the hinge elements 210, 220 to connect successive modules to each other. The modules 200 are capable of shifting laterally relative to each other to navigate curves.

The illustrative module 200 further includes a lifting flap 141 that is pivotally connected to a first side 212 of the module body 201 to form a surface for supporting the conveyed product 20. The illustrative lifting flap 141 is connected to the laterally inner side 212 of the module 200. The lifting flap 141 may have any suitable size, shape and—or configuration suitable for supporting a conveyed product 20. In a deployed position, shown in FIG. 5, the lifting flap 141 is horizontal, parallel to the conveying surfaces of the product conveyors 10, 40. As shown in FIG. 6, the lifting flap 141 can pivot about pivot locations 142 to a retracted position, shown in FIG. 7. In the retracted position, the lifting flap 141 is flipped to a vertical or substantially vertical position, making the module 200 more compact to fit in the returnway.

In the illustrative embodiment, both transfer conveyor belts 130, 140 are formed of identical modules, with the modules oriented opposite each other (i.e., belt 130 has the knuckle portion leading, while belt 140 has the hinge elements 220 leading) in order to keep the flaps 131, 141 on the laterally inner side of the transfer conveyor.

Alternatively, the transfer conveyor belt 130 comprises similar modules that are mirror images of the modules of the transfer conveyor belt 140, so that the lifting flap 131 is formed on the opposite side of the transfer conveyor belt.

Figure 8:
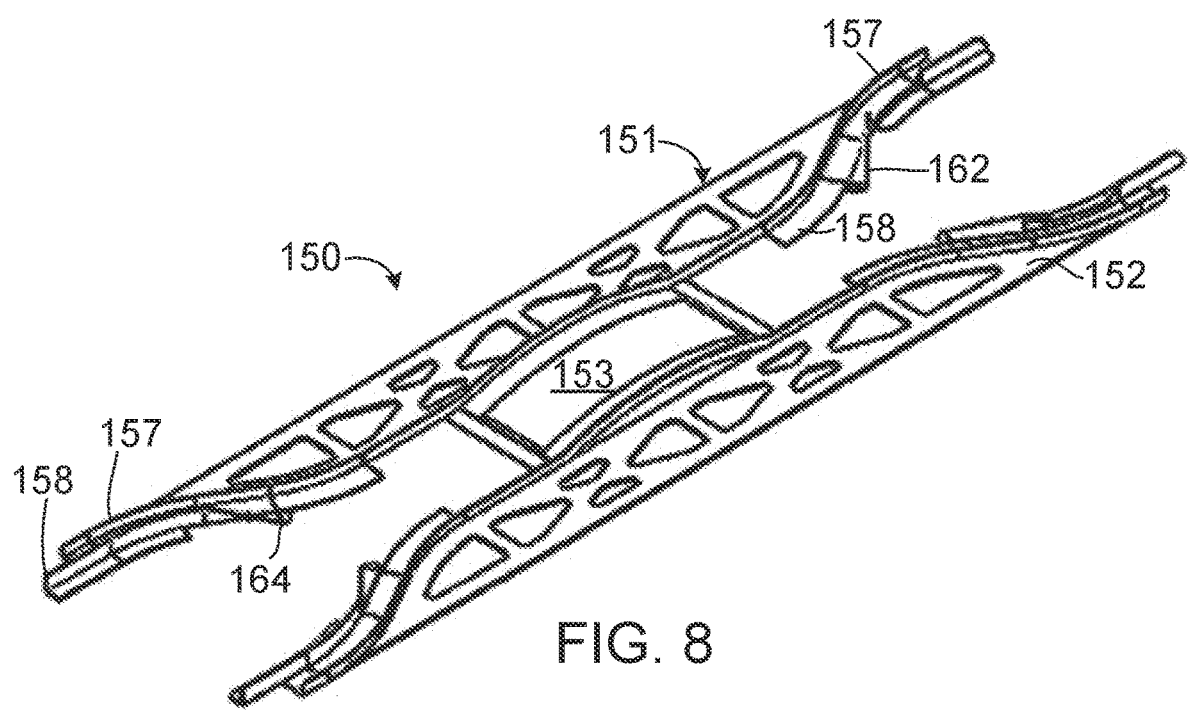
FIG. 8 is an isometric view of the frame of the conveyor system of FIG. 1.
Figure 9:
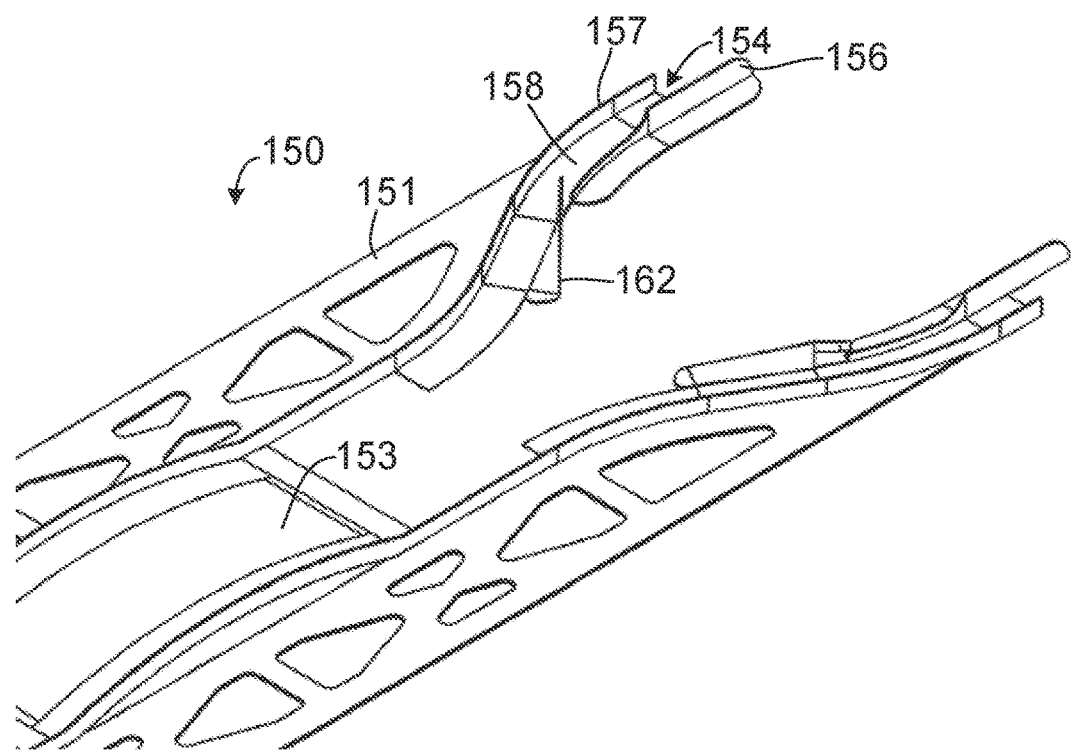
FIG. 9 is a detailed view of input end of the frame of FIG. 8.

FIGS. 8 and 9 show an embodiment of a frame 150 suitable for guiding the transfer conveyor belts 130, 140, as well as moving the lifting flaps 131, 141 between the deployed and retracted position. The illustrative frame 150 comprises props 151, 152 extending alone each side of the carryway. The props 151, 152 may be attached to the product conveyor frames (not shown). The illustrative props have a main body formed of sheet metal and including openings to reduce weight, but the invention is not so limited. A straight outer edge of the main body overlies the side edges of the product conveyors and spans the transfer gap between the product conveyors 10, 40.

Figure 10:
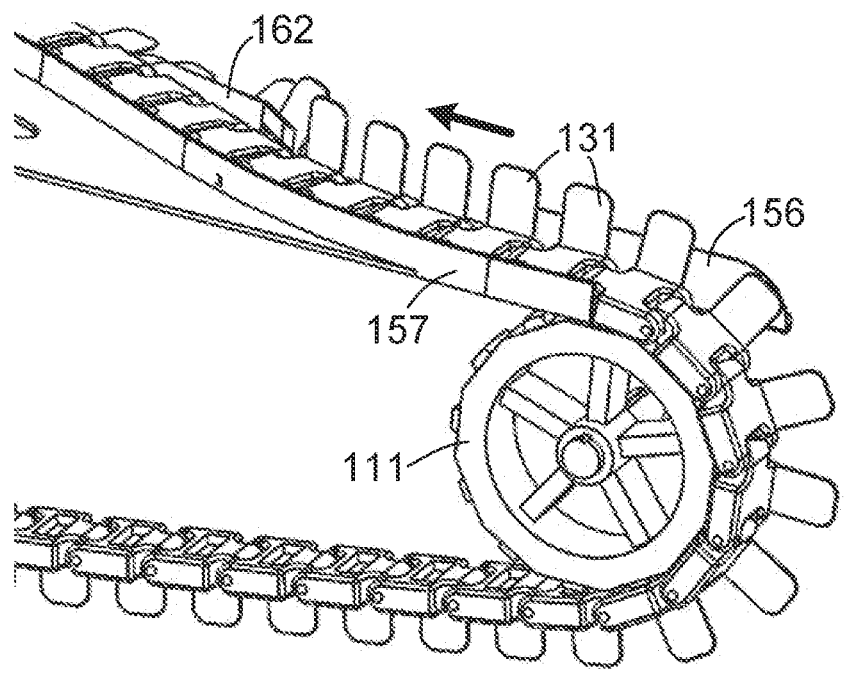
FIG. 10 is a detailed view of a first end of a transfer conveyor belt.
Figure 11:
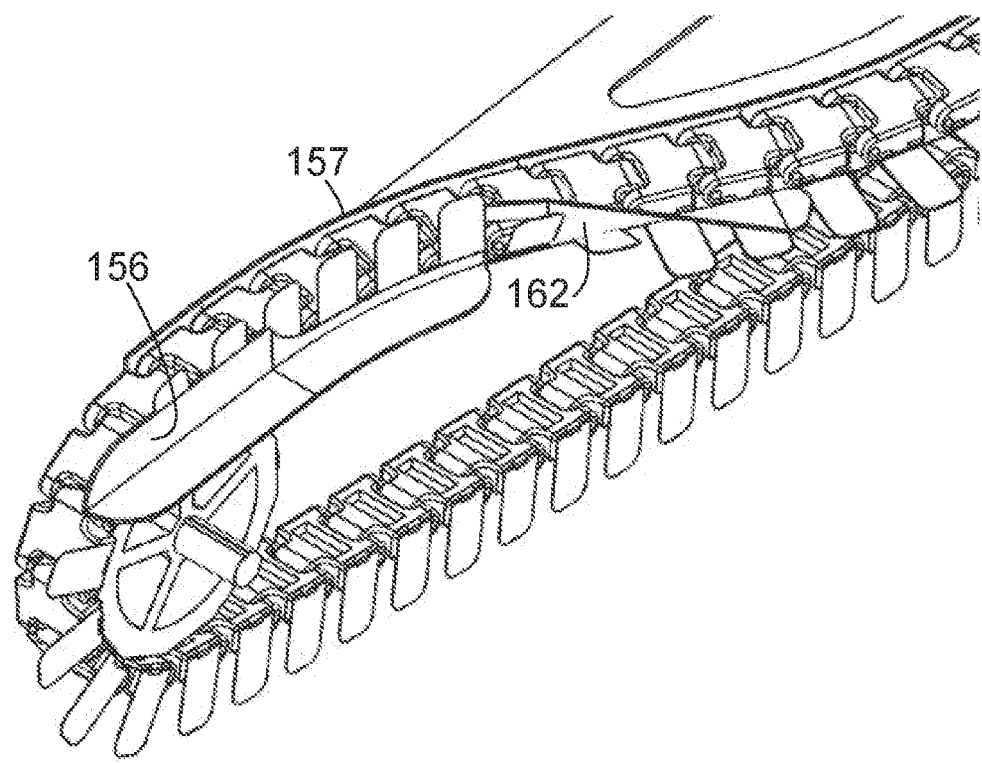
FIG. 11 is another detailed view of the first end of the transfer conveyor belt of FIG.

At a first end, shown in detail in FIGS. 10 and 11, each prop 151, 152 forms a channel 154 for guiding a transfer conveyor belt 130 or 140. The channel comprises an inner side wall 156, an outer side wall 157 and a bottom wall 158. The inner side wall 156 holds the flaps 131, 141 in the retracted position and only extends along the first end sections of the props 151, 152. Downstream of the inner side wall 156, the channel 154 includes a twisting flap dropping guide 162 for dropping the lifting flaps to the deployed position as the modules pass through the channel 154.

The outer side walls 157 extend from a straight first section adjacent the side edges of the first product conveyor at the first longitudinal location 15 to a curved second section. In the curved second section, the outer side walls curve laterally inward, pushing the conveyor belt modules 200 towards the center of the carryway. With the flaps in the deployed position, the transfer conveyor belts 130, 140 converge, placing the deployed flaps 131, 141 under the conveyed product with minimal impact on the product.

At a central portion, the outer side walls 157 form a narrowed carryway that is just wide enough to fit the product, so that the lifting flaps 131, 141 effect the conveying of the product. In the central portion, the frame 150 includes a transfer plate 153 that bridges the product conveyors. The illustrative transfer plate is curved and arcs over the transfer gap 14 between conveyor ends. The outer side walls 157 also bridge the transfer gap 14. The illustrative outer side walls are also arc-shaped and continue adjacent to the sides of the curved transfer plate 153 to confine and guide the transfer conveyor belts 130, 140. In the central portion, the transfer conveyor belts 130, 140 lift and carry the conveyed product over the transfer gap 14. In another embodiment, the transfer section of the transfer conveyor 30 is flat and the invention is not limited to arched components.

Figure 12:
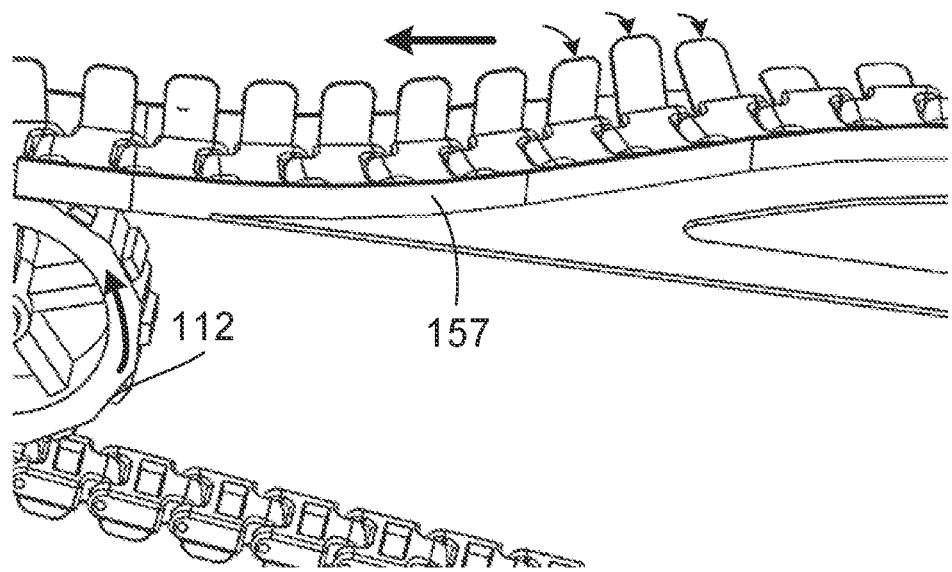
FIG. 12 is a detailed view of a second end of the transfer conveyor belt of FIG. 10.
Figure 13:
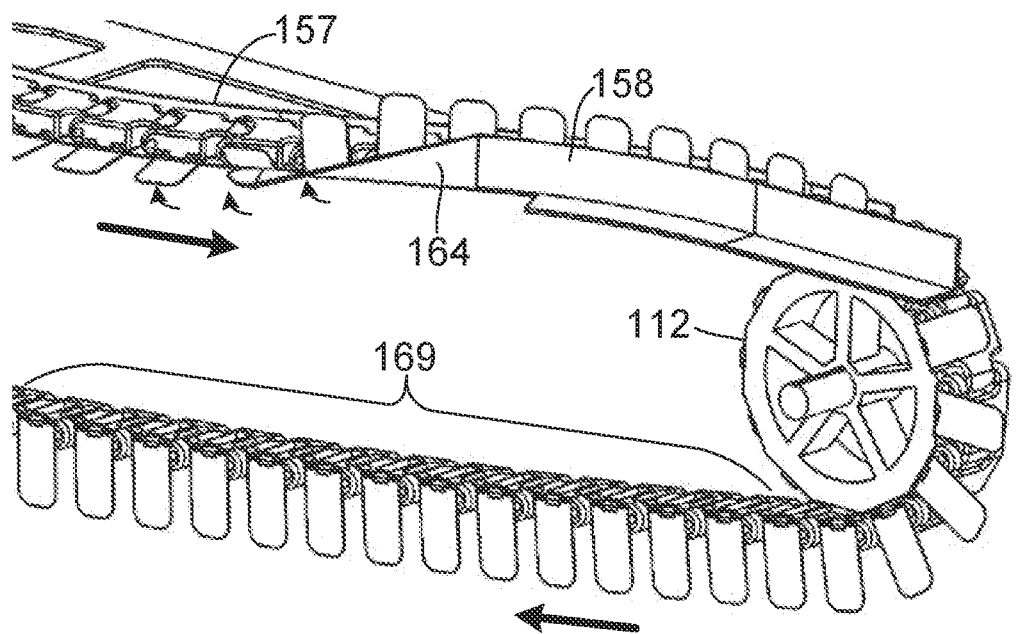
FIG. 13 is another detailed view of the second end of FIG. 12.

After the central portion, as shown in FIGS. 12 and 13, the outer side walls 157 form another curved section, causing the outer side walls 157 to widen out again to the side edges of the second product conveyor 40, pulling the flaps from under the product and transferring the product 20 to the second product conveyor 40. A twisting flap-lifting guide 164 pushes the flap 131 or 141 back to a vertical, retracted position for travel in the returnway 169. Inner side walls each 158 form another belt-guiding channel with the last, straight section of the outer side walls 157 to guide the transfer conveyor belts to the reversing element 112. The belt-guiding channel pushes the belt modules back to the side edges of the product conveyor 40 and holds the flaps in the retracted position. The flaps remain in the retracted position in the returnway 169.

The illustrative transfer conveyor provides gentle handling of products, reducing manual intervention during transfer.

While the illustrative flap actuators comprise twisting guides, alternative means for flipping the flaps between the deployed and retracted position may be used. For example, a mechanical, electrical or magnetic means may be used to move the flaps between the deployed and retracted positions.

Although features of the invention have been described with respect to various versions, other versions are possible. The scope of the claims is not meant to be limited to the specific versions used in this description.

What is claimed is:

1. A transfer conveyor for transferring product, comprising:
    a frame configured to overlay a transfer gap between a first product conveyor and a second product conveyor, the frame comprising
        a first outer side wall having a first section that extends along a first side of the first product conveyor, a second section that curves laterally inwards and a third section that bridges the transfer gap,
        a second outer side wall having a first section extends along a second side of the first product conveyor, a second section that curves laterally inwards and a third section that bridges the transfer gap, and
        a transfer plate extending between the third sections of the first and second outer side walls, the transfer plate bridging the transfer gap;
    a first transfer conveyor belt comprising a plurality of hingedly connected modules capable of shifting laterally relative to each other and forming an endless loop, the first transfer conveyor belt extending between the first product conveyor and the second product conveyor adjacent to the first outer side wall; and
    a second transfer conveyor belt comprising a plurality of hingedly connected modules capable of shifting laterally relative to each other and forming an endless loop, the second transfer conveyor belt extending between the first product conveyor and the second product conveyor adjacent to the second outer side wall.

2. The transfer conveyor of claim 1, wherein the first and second outer side walls each include a fourth section that curves laterally outwards towards the side edges of the second product conveyor.

3. The transfer conveyor of claim 2, wherein the first and second outer side walls each include a fifth section extending along each side edge of the second product conveyor.

4. The transfer conveyor of claim 3, wherein the frame further includes a first inner side wall opposing the first section of the first outer side wall to form a channel for guiding the first transfer conveyor belt.

5. The transfer conveyor of claim 4, wherein the first transfer conveyor belt includes a plurality of movable flaps for lifting product over the transfer gap.

6. The transfer conveyor of claim 5, wherein the frame further comprises a twisting flap dropping guide for deploying the movable flaps downstream of the first inner side wall.

7. The transfer conveyor of claim 6, wherein the frame further comprises a twisting flap lifting guide near the fourth section of the first outer side wall for lifting the movable flaps into an inactive position.

8. The transfer conveyor of claim 7, further comprising a second inner side wall opposing the fifth section of the first outer side wall for retaining the movable flaps in the inactive position.

9. The transfer conveyor of claim 1, wherein the transfer plate is curved vertically to arc over the transfer gap.

10. A conveying system, comprising:
    a first product conveyor for conveying product from an infeed to an outfeed;
    a second product conveyor for receiving product conveyed by first product conveyor and conveying the product away from the first product conveyor, the second product conveyor having an infeed separated from the first product conveyor outfeed by a transfer gap; and
    a transfer conveyor extending between the first product conveyor and the second product conveyor for lifting and carrying the product over the transfer gap.

11. The conveying system of claim 10, wherein the transfer conveyor comprises:
- a frame configured to overlay the transfer, the frame comprising
  - a first outer side wall having a first section that extends along a first side of the first product conveyor, a second section that curves laterally inwards and a third section that bridges the transfer gap,
  - a second outer side wall having a first section extends along a second side of the first product conveyor, a second section that curves laterally inwards and a third section that bridges the transfer gap, and
  - a transfer plate extending between the third sections of the first and second outer side walls, the transfer plate bridging the transfer gap;
- a first transfer conveyor belt comprising a plurality of hingedly connected modules capable of shifting laterally relative to each other and forming an endless loop, the first transfer conveyor belt extending between the first product conveyor and the second product conveyor adjacent to the first outer side wall; and
- a second transfer conveyor belt comprising a plurality of hingedly connected modules capable of shifting laterally relative to each other and forming an endless loop, the second transfer conveyor belt extending between the first product conveyor and the second product conveyor adjacent to the second outer side wall.

12. The conveying system of claim 11, wherein each hingedly connected module comprises:
- a main body;
- a first hinge element extending from a first end of the main body;
- a pair of hinge elements extending from a second end of the main body and forming a space for receiving the first hinge element of an adjacent module in a transfer conveyor belt formed by hingedly connecting a plurality of modules together; and
- a lifting flap pivotally connected to a first side of the module body to form a surface for supporting a conveyed product.

13. A module for a transfer conveyor, comprising:
- a main body;
- a first hinge element extending from a first end of the main body;
- a pair of hinge elements extending from a second end of the main body and forming a space for receiving the first hinge element of an adjacent module in a transfer conveyor belt formed by hingedly connecting a plurality of modules together; and
- a lifting flap pivotally connected to a first side of the module body to form a surface for supporting a conveyed product.

14. The module of claim 13, wherein the lifting flap pivots between a horizontal position and a vertical position.

* * * * *